(12) United States Patent
Matsutani et al.

(10) Patent No.: US 11,771,522 B2
(45) Date of Patent: Oct. 3, 2023

(54) DENTAL ROOT CANAL TREATMENT INSTRUMENT

(71) Applicant: MANI, Inc., Tochigi (JP)

(72) Inventors: Kazuhiko Matsutani, Tochigi (JP); Masayoshi Seki, Tochigi (JP)

(73) Assignee: MANI, Inc., Tochigi (JP)

( * ) Notice: Subject to any disclaimer, the term of this patent is extended or adjusted under 35 U.S.C. 154(b) by 67 days.

(21) Appl. No.: 17/617,166

(22) PCT Filed: Aug. 21, 2020

(86) PCT No.: PCT/JP2020/031723
§ 371 (c)(1),
(2) Date: Dec. 7, 2021

(87) PCT Pub. No.: WO2021/033776
PCT Pub. Date: Feb. 25, 2021

(65) Prior Publication Data
US 2022/0257338 A1    Aug. 18, 2022

(30) Foreign Application Priority Data

Aug. 22, 2019    (JP) .................. 2019-151994

(51) Int. Cl.
*A61C 5/42*    (2017.01)
(52) U.S. Cl.
CPC ..................... *A61C 5/42* (2017.02)
(58) Field of Classification Search
CPC ....................................... A61C 5/42
See application file for complete search history.

(56) References Cited

U.S. PATENT DOCUMENTS

| 4,538,989 A | 9/1985 | Apairo, Jr. et al. |
| 4,836,780 A | 6/1989 | Buchanan |

(Continued)

FOREIGN PATENT DOCUMENTS

| CN | 87106306 A | 3/1988 |
| CN | 1372871 A | 10/2002 |

(Continued)

OTHER PUBLICATIONS

International Search Report (ISR) dated Oct. 20, 2020 filed in PCT/JP2020/031723.

(Continued)

*Primary Examiner* — Nicholas D Lucchesi
*Assistant Examiner* — Hao D Mai
(74) *Attorney, Agent, or Firm* — Rankin, Hill & Clark LLP

(57) ABSTRACT

To reliably follow a tip end portion of a root canal and prevent biting into a root canal wall. A dental root canal treatment tool includes a shaft portion (A), a transition portion (D) formed continuously to the shaft portion, and a working portion (B) formed continuously to the transition portion. The working portion is formed in such a tapered shape that the working portion is narrowed from the transition portion to a tip end. A cross section (IIa) of the working portion closest to a shaft portion side is in a parallelogram shape having a pair of opposing long sides (1a), a pair of opposing short sides (2a), sharp edges (5a) formed on a long diagonal line (3a), and obtuse edge (6a) formed on a short diagonal line (4a). A cross section (IIb) of the working portion in the vicinity of the tip end thereof is in a shape having a pair of sides (1b) formed continuously from the long sides (1a), a pair of sides (2b) formed continuously from the short sides (2a), lands (7) formed continuously from the sharp edges on the long diagonal line (Continued)

(3b) and increasing in length from the shaft portion side to the vicinity of the tip end, and obtuse edges (6b) formed continuously to the obtuse edges on the short diagonal line (4b).

3 Claims, 5 Drawing Sheets

(56) References Cited

U.S. PATENT DOCUMENTS

| | | | |
|---|---|---|---|
| 9,066,773 | B2 | 6/2015 | Tetsuka et al. |
| 9,474,585 | B2 | 10/2016 | Pernot et al. |
| 9,801,696 | B2 | 10/2017 | Rota et al. |
| 10,123,850 | B2 | 11/2018 | Rota et al. |
| 10,932,884 | B2 | 3/2021 | Rota et al. |
| 11,523,880 | B2 | 12/2022 | Rota et al. |
| 2001/0004518 | A1 | 6/2001 | Murai et al. |
| 2002/0119418 | A1 | 8/2002 | Matsutani et al. |
| 2006/0228669 | A1 | 10/2006 | Scianamblo |
| 2006/0246394 | A1 | 11/2006 | Cantatore et al. |
| 2010/0119990 | A1 | 5/2010 | Lampert |
| 2010/0173263 | A1 | 7/2010 | Tetsuka et al. |
| 2012/0021376 | A1 | 1/2012 | Iwamoto et al. |
| 2012/0308957 | A1 | 12/2012 | Katoh |
| 2013/0260334 | A1 | 10/2013 | Pernot et al. |
| 2015/0216624 | A1 | 8/2015 | Shotton et al. |
| 2015/0320517 | A1 | 11/2015 | Rota et al. |
| 2018/0008374 | A1 | 1/2018 | Rota et al. |
| 2018/0256292 | A1 | 9/2018 | Fatiny |
| 2019/0046291 | A1 | 2/2019 | Rota et al. |
| 2021/0145540 | A1 | 5/2021 | Rota et al. |

FOREIGN PATENT DOCUMENTS

| | | |
|---|---|---|
| CN | 101677838 A | 3/2010 |
| CN | 102770090 A | 11/2012 |
| CN | 103249371 A | 8/2013 |
| CN | 104739525 A | 7/2015 |
| CN | 104902841 A | 9/2015 |
| CN | 206518609 U | 9/2017 |
| CN | 208319344 U | 1/2019 |
| DE | 19901777 A1 | 7/2000 |
| JP | 2001-170077 A | 6/2001 |
| JP | 2001-187068 A | 7/2001 |
| JP | 4214285 B2 | 1/2009 |
| JP | 4214286 B2 | 1/2009 |
| JP | 2017-113361 A | 6/2017 |
| WO | 2010/098385 A1 | 9/2010 |
| WO | 2014/118591 A1 | 8/2014 |
| WO | 2014/205411 A2 | 12/2014 |

OTHER PUBLICATIONS

Chinese Office Action (CNOA) dated Oct. 31, 2022 for Chinese Patent Application No. 202080040103.4.
Indian Office Action (INOA) dated May 13, 2022 for Indian Patent Application No. 202127053666.

FIG. 2
(a)
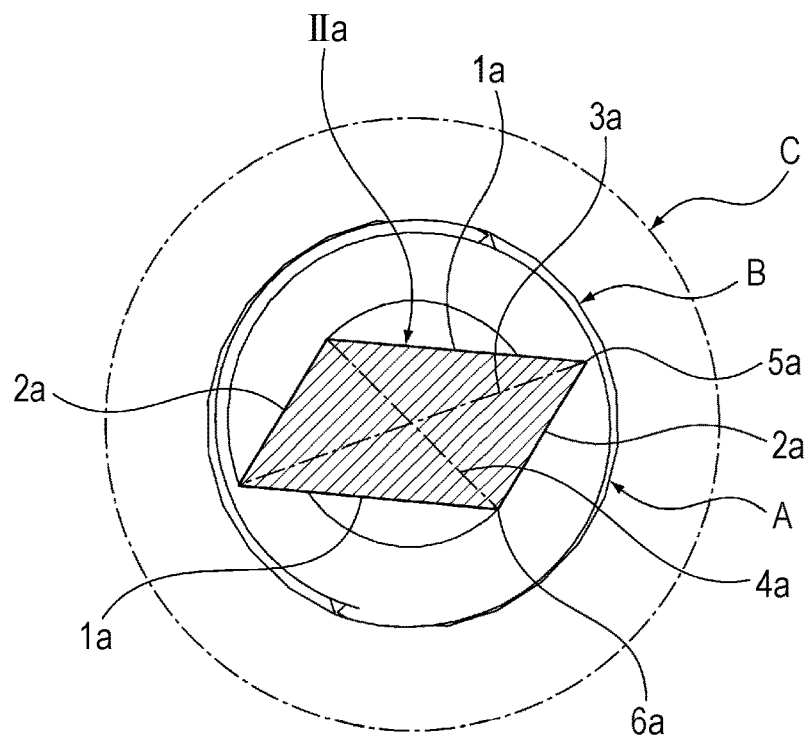
(b)
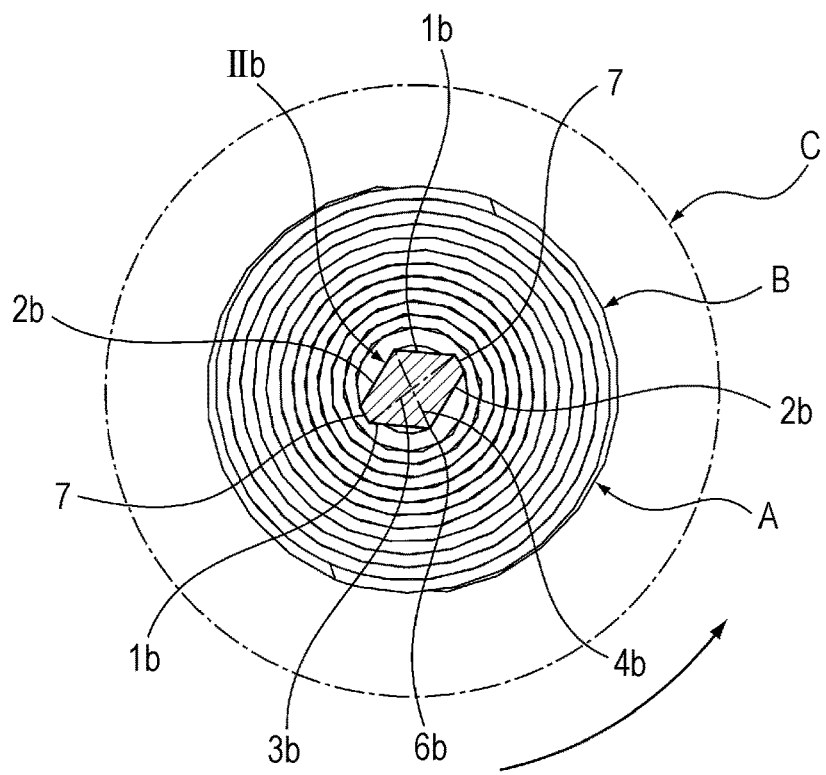

DENTAL ROOT CANAL TREATMENT INSTRUMENT

TECHNICAL FIELD

The present invention relates to a root canal treatment tool having a spiral cutting blade used when a root canal is shaped in dental treatment.

BACKGROUND ART

A tooth root canal has an extremely-thin tip end portion, and entirely has a slightly-bent shape. Such a shape is different among individuals. Upon root canal treatment, a bent root canal wall is cut and shaped into a tapered shape. Such shaping of the root canal is performed using a root canal treatment tool having a spiral cutting blade called a file or a reamer.

That is, a doctor performs the operation of rotating, with fingers, the file or reamer selected by the doctor or the operation of pushing or pulling the file or the reamer, thereby shaping the root canal. In recent years, the selected root canal treatment tool is held by a chuck of a rotary drive tool called a hand piece, and in this state, is rotated to perform the root canal treatment in many cases.

The root canal treatment tool has a handle and a cutting member fixed to the handle. The handle has an optimal shape for the operation of gripping the handle by the doctor or the operation of holding the handle by the hand piece. The cutting member has a shaft portion fixed to the handle and a working portion formed continuously to the shaft portion, and the working portion is formed in a tapered shape.

For the root canal treatment tool, e.g., favorable cutting performance for the root canal wall, favorable cutting chip discharging performance, and the performance for flexibly following the root canal are required. Moreover, the performance for avoiding a difficulty in the operation due to biting of a tip end portion of the root canal treatment tool into a tip end portion of the root canal and avoiding rupture upon the root canal treatment is also required. In response to such demands, root canal treatment tools described in Patent Literatures 1 and 2 have been proposed.

The technique described in Patent Literature 1 relates to the root canal treatment tool such as a file or a reamer, and is capable of providing cuttability only in pulling operation without providing cuttability upon pushing operation. The root canal treatment tool is configured such that the shape of the cross section of a working portion is a parallelogram shape of which long sides have a length of equal to or greater than 1.5 times as great as that of short sides and a sharp edge of two edges close to each other in a longitudinal direction of the working portion is arranged on a shaft portion side.

In the root canal treatment tool described in Patent Literature 1, the cross section of the working portion is formed in the parallelogram shape, and therefore, the root canal treatment tool has flexibility, so that the root canal treatment tool can favorably follow a bent root canal. Moreover, the cuttability is provided when a doctor performs the pulling operation, and therefore, cutting chips can be easily discharged from the root canal.

The technique described in Patent Literature 2 relates to the root canal treatment tool such as a file or a reamer, and improves the flexibility of a base portion of a working portion. The root canal treatment tool is configured such that the shape of the cross section of the working portion is a parallelogram shape, a long side length/a short side length in the cross section of the base portion on a shaft portion side is greater than a long side length/a short side length in the cross section of a tip end portion, and a torsion angle on a base portion side is greater than a torsion angle at the tip end portion.

In the root canal treatment tool described in Patent Literature 2, the long side/the short side length in the cross section of the parallelogram shape is changed between the base portion and the tip end portion of the working portion, and therefore, the flexibility of the base portion can be enhanced. Thus, operability can be improved.

CITATION LIST

Patent Literature

PATENT LITERATURE 1: Japanese Patent No. 4214285 (JP 1999-0358917)
PATENT LITERATURE 2: Japanese Patent No. 4214286 (JP 2000-000481)

SUMMARY OF INVENTION

Problems to be Solved by Invention

In each of the root canal treatment tools described in Patent Literatures 1 and 2, the edges with the sharp angles are on the circumference, and therefore, such a root canal treatment tool has a characteristic that excellent cutting performance is provided. However, due to the excellent cutting performance, there are probabilities that the performance for cutting the root canal wall is preferentially provided at the tip end portion of the root canal and a treatment path deviates from an intended path and that it is difficult to perform the operation due to biting into the root canal wall.

An object of the present invention is to provide a dental root canal treatment tool having the characteristics of Patent Literatures 1 and 2 and being capable of reliably following a tip end portion of a root canal while preventing biting into a root canal wall.

Solution to Problems

In order to solve the above problems, a typical dental root canal treatment tool according to the present invention includes a shaft portion; a transition portion formed continuously to the shaft portion; and a working portion formed continuously to the transition portion, wherein the working portion is formed in such a tapered shape that the working portion is narrowed from the transition portion to a tip end, a cross section of the working portion closest to a shaft portion side is in a parallelogram shape having a pair of opposing long sides, a pair of opposing short sides, a sharp edge formed on a long diagonal line, and an obtuse edge formed on a short diagonal line, and a cross section of the working portion in a vicinity of the tip end thereof is in a shape having sides formed continuously from the pair of long sides, sides formed continuously from the pair of short sides, a land formed continuously from the sharp edge on the long diagonal line and having a flat surface or a curved surface and increasing in length from the shaft portion side to the vicinity of the tip end, and an obtuse edge formed continuously from the obtuse edge on the short diagonal line.

Effects of Invention

The dental root canal treatment tool (hereinafter merely referred to as a "root canal treatment tool") according to the present invention can reliably follow even a root canal with a curved tip end portion and can prevent biting into a root canal wall.

That is, the land increasing in length from the shaft portion side to the vicinity of the tip end of the working portion is formed on the long diagonal line of the parallelogram shape, and therefore, the edge on the long diagonal line in the vicinity of the tip end of the working portion is formed by the land and the side. Thus, the land faces the root canal wall upon root canal treatment, and no biting is caused even when the operation of rotating the root canal treatment tool or reciprocating the root canal treatment tool in a longitudinal direction of the working portion is performed. An angle (a rake angle) between the long diagonal line and the side can be a rake angle providing favorable cutting performance as in a rake angle on the shaft portion side. Thus, favorable cutting performance can be held, and the probability of the root canal treatment tool being caught by the root canal wall can be reduced. Moreover, the root canal treatment tool can reliably follow the curve of the tip end portion of the root canal.

BRIEF DESCRIPTION OF DRAWINGS

FIG. 2 shows enlarged views for describing the shape of the cross section of a working portion according to the first embodiment.

DESCRIPTION OF EMBODIMENTS

Figure 1:
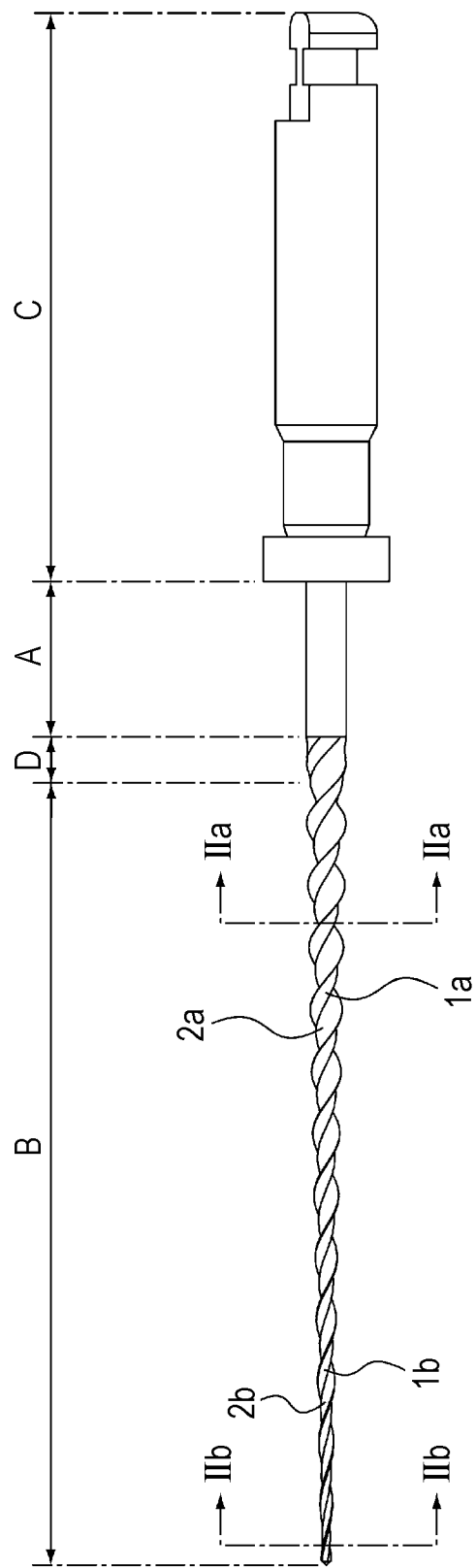
FIG. 1 shows a side view of a root canal treatment tool according to a first embodiment.
Figure 3:
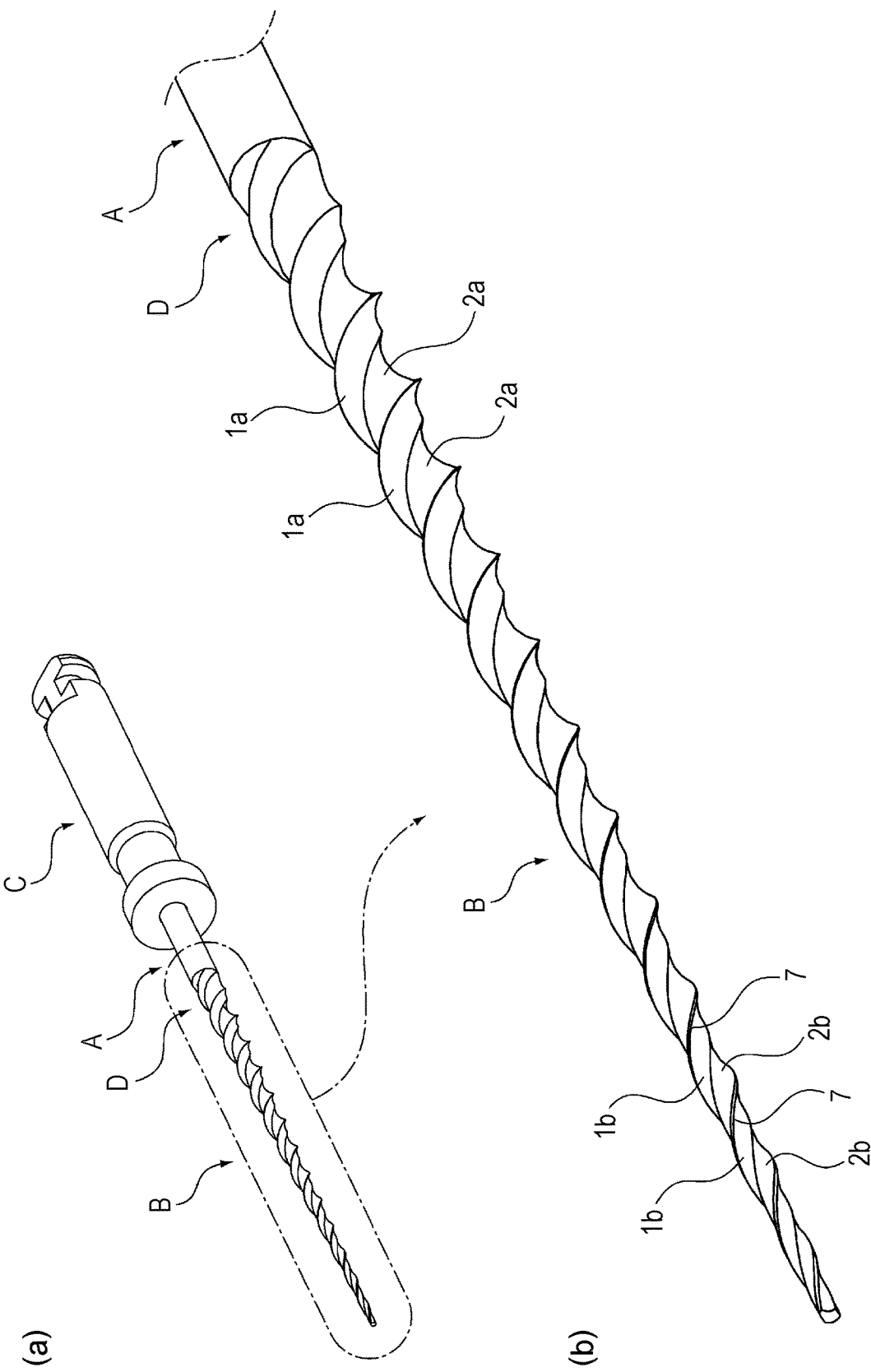
FIG. 3 shows enlarged perspective views for describing the structure of the working portion.

Hereinafter, a root canal treatment tool according to the present invention will be described. The root canal treatment tool according to the present invention has a shaft portion, a transition portion formed continuously to the shaft portion, and a tapered working portion formed continuously to the transition portion, and is provided for shaping a target root canal into a tapered shape upon dental treatment. Specifically, upon initial shaping of the root canal or shaping of a tip end portion of the root canal, the root canal treatment tool can reliably follow the curve of the root canal, and biting of the root canal treatment tool into a root canal wall can be prevented.

The working portion is formed in such a tapered shape that the working portion is narrowed from a shaft portion side to a tip end. The taper of the working portion is standardized as 2/100 according to ISO. However, the working portion is not limited to the taper as described above, and as necessary, preferably has an optimal taper according to a treatment location. The thickness of the working portion is, at a tip end portion thereof, set within a range of 0.06 mm to 1.40 mm, and multiple types of working portions having different dimensions within such a range are standardized. The working portion is formed in a spiral shape, and a clearance is formed between adjacent ones of edges upon treatment of the root canal. Thus, cutting chips can be discharged through these clearances.

The root canal treatment tool according to the present invention does not limit to, during the treatment, operation performed with the root canal treatment tool being gripped by a doctor or operation performed with the root canal treatment tool being attached to a hand piece. Thus, according to an operation method, the root canal treatment tool is molded integrally with a synthetic resin handle so that the doctor can grip the shaft portion, or is integrated with a metal shank so that the root canal treatment tool can be gripped by a chuck of the hand piece.

The root canal treatment tool according to the present invention is configured such that a cross section of the working portion closest to the shaft portion side is formed in a parallelogram shape having a pair of opposing long sides, a pair of opposing short sides, sharp edges formed on a long diagonal line, and obtuse edges formed on a short diagonal line. Moreover, a cross section of the working portion in the vicinity of the tip end thereof is formed in a shape having a pair of sides formed continuously from the pair of long sides, a pair of sides formed continuously from the pair of short sides, lands formed continuously from the sharp edges on a long diagonal line and increasing in length from the shaft portion side to a tip end side, and obtuse edges formed continuously from the obtuse edges on a short diagonal line. Note that the transition portion is a portion formed for smoothly connecting the shaft portion with a circular section and the working portion with a parallelogram section and has little cutting capacity.

On the long diagonal line in the cross section of the working portion, the sharp edges are formed because the long sides and the short sides forming the parallelogram shape directly cross each other on the shaft portion side of the working portion, and in the vicinity of the tip end, the land having a flat surface or a curved surface is formed between each side formed continuously from the long side and each side formed continuously from the short side. As described above, the lands are not formed on the shaft portion side, but are formed in the vicinity of the tip end. Moreover, the lands increase in length from the shaft portion side to the vicinity of the tip end.

Thus, in the vicinity of the tip end of the working portion, the edges are formed because the sides formed continuously from the long sides and the lands cross each other. An angle between the side formed continuously from the long side and the land is greater than an angle between the long side and the short side at the edge on the long diagonal line on the shaft portion side. With this configuration, the edges with great angles contact, in the vicinity of the tip end, the root canal wall upon the root canal treatment, so that biting can be prevented. As a result, the root canal treatment tool can flexibly follow, e.g., the curve of the root canal, and the treatment can be performed along an intended path.

As compared to a typical root canal treatment tool, the cross-sectional area of the working portion in the vicinity of the tip end thereof is larger. Thus, rupture which might be caused during the treatment can be prevented, and flexural rigidity is increased, so that favorable reactive force can be transmitted to the doctor upon the treatment.

In the present invention, the vicinity of the tip end of the working portion is preferably within an area of 0.5 mm to 1.0 mm from a pointed end of the working portion. However, the vicinity of the tip end of the working portion is not necessarily within this area, and the area may be 0.5 mm to 1.5 mm or 0.5 mm to 2.0 mm. The vicinity of the shaft portion on the shaft portion side is a predetermined area from the position of the working portion closest to the shaft portion side, and in other words, is the vicinity of a boundary portion between the working portion exhibiting favorable cutting performance and the transition portion formed between the working portion and the shaft portion to transition from the working portion to the shaft portion. However, the vicinity of the shaft portion is not necessarily this boundary portion, and a necessary length from the pointed end for actually performing the root canal treatment may be set.

The length of the land formed in the vicinity of the tip end is not limited, and is preferably set as necessary according to the size of an intended root canal treatment tool. The land may be the flat surface or the curved surface. The land preferably forms the flat surface or the curved surface according to the method for manufacturing the root canal treatment tool, as necessary.

For example, a portion, which corresponds to the working portion, of an intermediate material for manufacturing the root canal treatment tool is formed in a conical shape with a preset taper, and such a conical portion is, by grinding, formed into an intended working portion. In this case, the land forms the curved surface or the flat surface.

The material of the root canal treatment tool is not limited, and austenite-based stainless steel, martensite-based stainless steel, titanium alloy having a shape memory function, etc. can be selectively utilized. Then, an intended root canal treatment tool is preferably manufactured in such a manner that the selected material is processed by an optimal processing method.

Next, a first embodiment of the root canal treatment tool will be described with reference to FIGS. 1 to 4. The root canal treatment tool according to the first embodiment is configured to be rotatably driven with the root canal treatment tool being attached to a hand piece. Thus, the root canal treatment tool has a shaft portion A, a transition portion D formed continuously to the shaft portion A, a working portion B formed continuously to the transition portion D, and a shank portion C to which the shaft portion A is fixed such that the shank portion C is gripped by a chuck of the hand piece.

A portion from the shaft portion A to the working portion B is continuously formed from a single material. The shaft portion A is formed in a shaft shape such that one side thereof is formed continuously to the transition portion D and the working portion B and the other side thereof is integrally connected to the shank portion C.

The working portion B is formed in such a tapered shape that the working portion B is narrowed from a shaft portion side to a tip end, and a cross section of the working portion B in the vicinity of the shaft portion and a cross section of the working portion B in the vicinity of the tip end have different shapes. That is, as shown in FIG. 2(a), a section IIa at a position in the vicinity of the shaft portion is in a parallelogram shape including a pair of opposing long sides 1a and a pair of opposing short sides 2a, and sharp edges 5a are formed on a long diagonal line 3a and obtuse edges 6a are formed on a short diagonal line 4a.

As shown in FIG. 2(b), a section IIb at a position in the vicinity of the tip end of the working portion B includes a pair of sides 1b formed continuously from the pair of long sides 1a forming the cross section IIa in the vicinity of the shaft portion, a pair of sides 2b formed continuously from the pair of opposing short sides 2a forming the cross section IIa, lands 7 formed continuously from the sharp edges 5a on a long diagonal line 3b and increasing in length from the vicinity of the shaft portion to the vicinity of the tip end, and obtuse edges 6b formed continuously to the obtuse edges 6a on a short diagonal line 4b. Note that among two diagonal lines connecting end points of the pair of sides 1b, a longer one is the long diagonal line 3b and a shorter one is the short diagonal line 4b.

The shape of the section IIa and the shape of the section IIb change continuously from the shaft portion side to a tip end side of the working portion B. The parallelogram shape of the section IIa and the shape of the section IIb are set in advance, and the decrease rates of the long sides 1a and the short sides 2a forming these shapes are set. The dimensions of the sides 1b formed continuously to the long sides 1a are set considering the dimensions of the lands 7 formed in the section IIb, and the decrease rates are also set. The decrease rate from the short side 2a to the side 2b formed continuously to the short side 2a does not change.

In other words, the shape of the section IIa is formed in such a manner that when the root canal treatment tool is rotated in the direction of an arrow in FIG. 2, the pair of sides 1b forming a rake angle in the section IIb is held in a parallel state, and is machined from the tip end side to the shaft portion side such that the pair of sides 1b approaches the sides 2b forming a clearance angle on the opposite sides of the lands 7. As described above, the sectional shape is formed while the pair of sides 1b is held in the parallel state, and therefore, processing and dimension management are facilitated.

Figure 4:
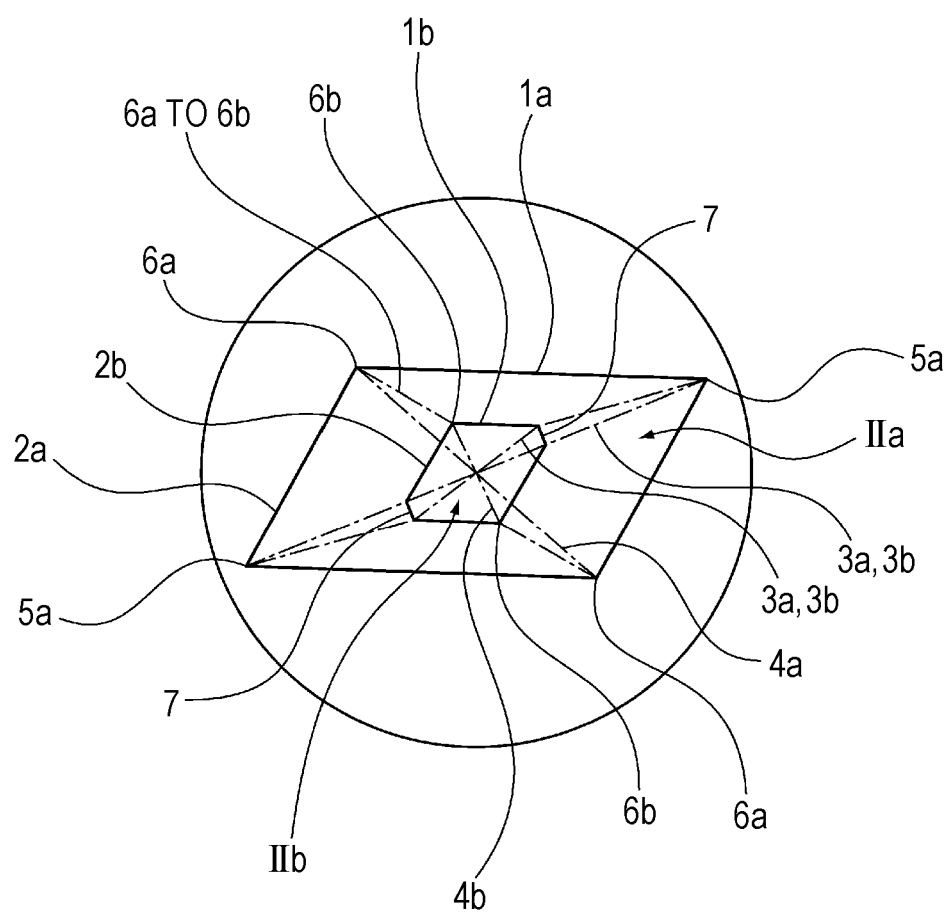
FIG. 4 shows a schematic view for describing a change in the shape of the cross section and a change in a land.

As a result, as schematically shown in FIG. 4, the pair of opposing long sides 1a in the section IIa is continuously separated in the course of extending to the section IIb, and the lands 7 are formed at these separation portions. An angle between the long diagonal line 3a and the long side 1a in the section IIa is smaller than an angle between the long diagonal line 3b and the side 1b in the section IIb. Thus, the cutting performance of the working portion B on the tip end side thereof is lower than that on the shaft portion side.

Note that lines 6a to 6b shown in FIG. 4 are the trajectories of the obtuse edges from the section IIa to the section IIb and the angle of the edge 6a in the section IIa is the same as the angle of the edge 6b in the section IIb. When the pair of sides 1b is held in the parallel state as described above, the angle is the same between the edge 6a and the edge 6b. This case is preferred because processing and dimension management are facilitated, but needless to say, the angle may be different between the edge 6a and the edge 6b.

In the case of grinding, a change in the shape from the section IIa to the section IIb as described above may be made by adjustment of the amount of machining of a grinding material upon formation of the working portion B.

In the root canal treatment tool formed as described above, the lands 7 are formed on the tip end side of the working portion B, and therefore, the root canal wall is not cut with the sharp edges (5a) upon the root canal treatment. Thus, the root canal treatment tool can favorably follow the root canal wall without the edges, which are formed by the sides 1b and the lands 7, biting into the root canal wall. Thus, upon the treatment, a pulling feeling is not provided to the doctor, and the root canal wall is not broken through.

Next, a second embodiment will be described with reference to FIG. 5. Note that in the figure, the same reference numerals are used to represent the same portions as those of the above-described first embodiment and description thereof will be omitted.

Figure 5:
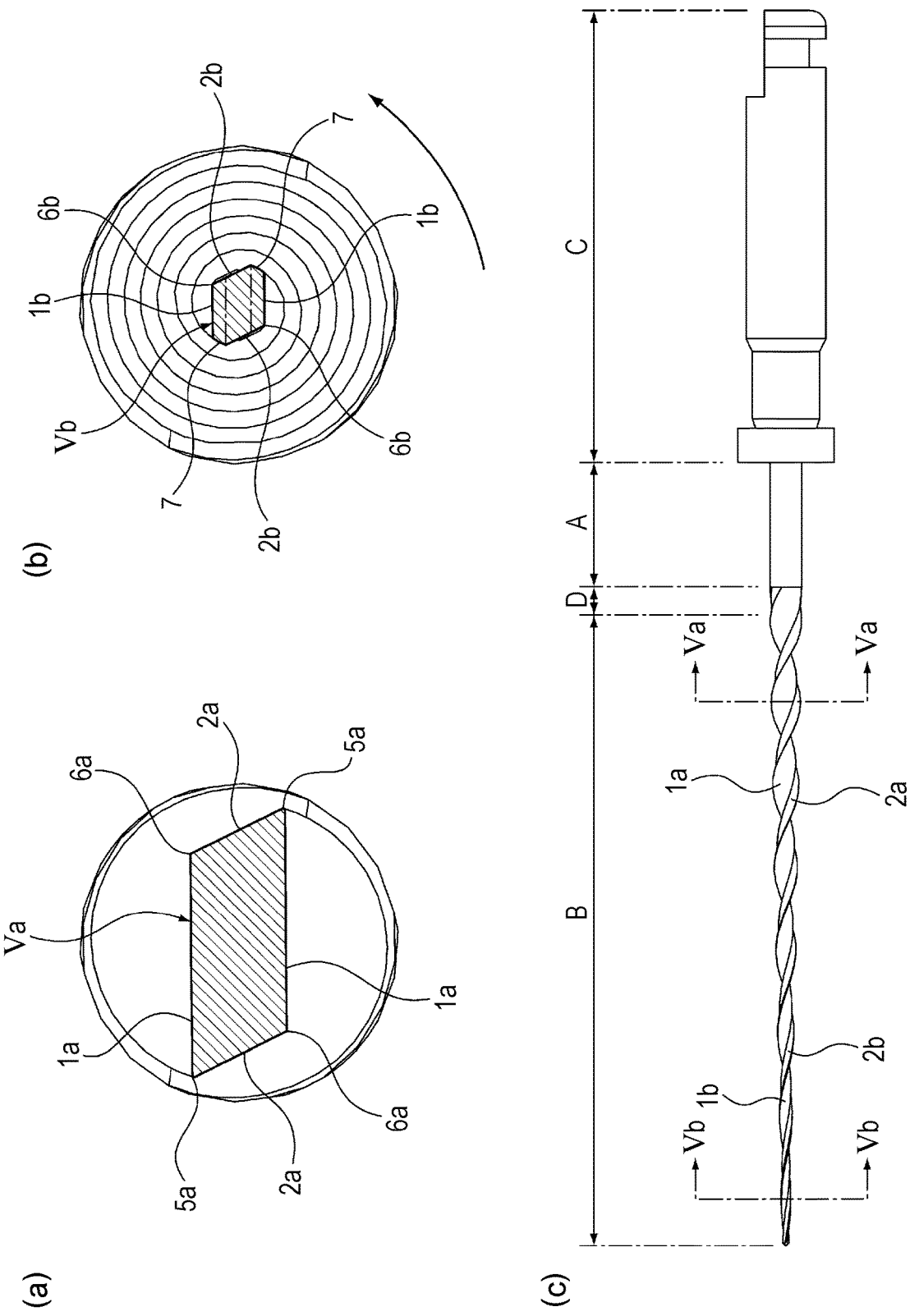
FIG. 5 shows enlarged views for describing the shape of the cross section of a working portion according to a second embodiment.

In the present embodiment, the parallelogram shape of a section Va is formed in such a manner that when a root canal treatment tool is rotated in the direction of an arrow in FIG. 5, the pair of sides 1b forming a clearance angle in a section Vb is machined from a tip end side to a shaft portion side, while being held in a parallel state, such that a pair of sides 1*b* approaches sides 2*b* forming a rake angle on the opposite sides of lands 7.

In the present embodiment, advantageous effects similar to those of the root canal treatment tool according to the above-described first embodiment can be also provided. Specifically, the rake angle does not change when the root canal treatment tool is rotated in a counterclockwise direction, but changes upon rotation in a clockwise direction. In recent years, a hand piece configured to change a rotation direction to a counterclockwise direction or a clockwise direction at a certain interval has been provided, and such a hand piece can be applied to perform effective treatment.

INDUSTRIAL APPLICABILITY

The root canal treatment tool according to the present invention can be utilized upon the root canal treatment in the dental treatment.

LIST OF REFERENCE SIGNS

A Shaft Portion
B Working Portion
C Shank Portion
D Transition Portion
1*a* Long Side
1*b* Side Formed Continuously from Long Side 1*a*
2*a* Short Side
2*b* Side Formed Continuously from Short Side 2*a*
3*a*, 3*b* Long Diagonal Line
4*a*, 4*b* Short Diagonal Line
5*a* Sharp Edge
6*a*, 6*b* Obtuse Edge
7 Land

The invention claimed is:
1. A dental root canal treatment tool comprising:
a shaft portion;
a transition portion formed continuously to the shaft portion; and
a working portion formed continuously to the transition portion,
wherein the working portion is formed in such a tapered shape that the working portion is narrowed from the transition portion to a tip end,
a cross section of the working portion closest to a shaft portion side is in a parallelogram shape having a pair of opposing long sides, a pair of opposing short sides, a sharp edge formed on a long diagonal line, and an obtuse edge formed on a short diagonal line, and
a cross section of the working portion in a vicinity of the tip end thereof is in a shape having sides formed continuously from the pair of long sides, sides formed continuously from the pair of short sides, a land formed continuously from the sharp edge on the long diagonal line and having a flat surface or a curved surface and increasing in length from the shaft portion side to the vicinity of the tip end, and an obtuse edge formed continuously from the obtuse edge on the short diagonal line.

2. The dental root canal treatment tool according to claim 1, wherein
as the length of the land increases from the shaft portion side to the vicinity of the tip end of the working portion, an angle between the long diagonal line and the long side or the side formed continuously from the long side in the cross section increases from the shaft portion side to the vicinity of the tip end of the working portion.

3. The dental root canal treatment tool according to claim 1, wherein
as the length of the land increases from the shaft portion side to the vicinity of the tip end of the working portion, an angle between the short diagonal line and the long side or the side formed continuously from the long side in the cross section increases from the shaft portion side to the vicinity of the tip end of the working portion.

* * * * *